UNITED STATES PATENT OFFICE.

CARL DUISBERG, OF ELBERFELD, GERMANY, ASSIGNOR TO THE FARBEN-FABRIKEN, VORMALS FR. BAYER & CO., OF SAME PLACE.

VIOLET DYE.

SPECIFICATION forming part of Letters Patent No. 447,302, dated March 3, 1891.

Application filed August 19, 1889. Serial No. 321,305. (Specimens.) Patented in Spain September 12, 1885, Nos. 9,505 and 6,017; in England November 24, 1885, No. 14,424; in Germany February 9, 1886, No. 40,247; in France February 15, 1886, No. 133,042; in Italy March 26, 1886, No. 19,967, and in Austria-Hungary December 1, 1888, No. 20,062 and No. 98,178.

*To all whom it may concern:*

Be it known that I, CARL DUISBERG, doctor of philosophy, (assignor to the FARBENFABRIKEN VORMALS FR. BAYER & CO.,) subject of the Emperor of Germany, residing at Elberfeld, Germany, have invented a new and useful Improvement in the Manufacture of a Violet Direct-Dyeing Coloring-Matter, (for which the FARBENFABRIKEN, VORMALS FR. BAYER & CO. have obtained Letters Patent in Germany February 9, 1886, No. 40,247; in France February 15, 1886, No. 133,042; in England November 24, 1885, No. 14,424; in Spain September 12, 1885, Nos. 9,505 and 6,017; in Italy March 26, 1886, No. 19,967, and in Austria-Hungary December 1, 1888, No. 20,062 and No. 98,178,) of which I give in the following a clear and exact description.

My invention relates to the manufacture of a violet direct-dyeing coloring-matter deriving from tetrazodiphenyldialkyl ether one molecule alpha naphthol-monosulpho-acid and one molecule alpha-naphthylamine monosulpho-acid.

In carrying out my process practically I proceed as follows: Ten kilos diamidodiphenoldialkyl ether are dissolved in one hundred and fifty liters of water and twenty kilos of muriatic acid. To this solution, which is cooled by ice, a watery solution of six kilos sodium nitrite is gradually added. The tetrazo compound of diamidodiphenoldialkyl ether being immediately formed is filtered and the obtained clear tetrazo solution poured into an acetic-acid solution of 9.5 kilos of alpha-naphthylamine monosulpho-acid. By adding acetate of soda the so-called intermediate product "diamidodiphenoldialkyl ether" and one molecule alpha-naphthylamine monosulpho-acid is immediately formed as a dark precepitate. After standing for half an hour this product is poured into an alkaline solution of twelve kilos alpha-naphthol monosulpho-acid made alkaline by sodium carbonate. A blue-red coloring-matter results, which is isolated by common salt, filtered, and dried. It has the following constitution:

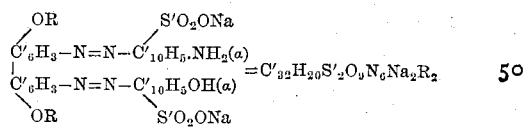

and forms in the dry state a green-blue amorphous powder which is easily soluble in water with violet color.

By R in the above formula is meant the radical aromatic combination—namely, $CH_3$ $CH_{25}$ $CH_{37}$, and OR means $OCH_3$ $OCH_{25}$. In concentrated sulphuric acid it is dissolved with a green-blue color. A watery solution separates the dye-stuff acid as a fine blue precipitate. It dyes unmordanted cotton in an alkaline soap-bath a fine violet. If thus colored cotton is boiled with a weak watery solution of copper vitriol the shade of the dye-stuff is totally changed. Instead of a red-violet, a red-blue results, which represents the copper compound of the dye-stuff.

Having thus described my invention and in what manner it can be executed, that what I claim as new, and desire to secure by Letters Patent, is—

The coloring-matter herein described, which is derived from the action of one molecule of tetrazodiphenoldialkyl ether first on one molecule of alpha-naphthylamine-monosulpho-acid and then on one molecule of alpha-naphthol monosulpho-acid, and which forms in a dry state a green-blue amorphous powder which is easily soluble in water with a violet shade and in concentrated sulphuric acid with a fine green-blue color, and which is precipitated out of a watery solution by the addition of a mineral acid as a blue precipitate.

In testimony whereof I have signed my name in presence of two subscribing witnesses.

CARL DUISBERG.

Witnesses:
 PHILIPP OTT,
 WILHELM PFITZINGER.